United States Patent [19]
Fahrer et al.

[11] Patent Number: 6,038,307
[45] Date of Patent: *Mar. 14, 2000

[54] INTERNATIONAL REDIAL SYSTEM DRIVEN BY UNSUCCESSFUL CALL REASONS

[75] Inventors: Harold Fahrer, Denville; Shubert A. Hau, Wayne; A Helen McGrath, Summit; Alan B. Moshinsky, Somerville; Johan Adriaan Oudmaijer, Atlantic Highlands; Christine Patricia Peterson, Fords, all of N.J.

[73] Assignee: AT&T Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/919,000

[22] Filed: Aug. 27, 1997

[51] Int. Cl.[7] .......................................................... H04M 3/42
[52] U.S. Cl. ............................. 379/209; 379/32; 379/207; 379/220
[58] Field of Search ..................................... 379/209, 201, 379/207, 265, 214, 221, 132, 219, 220

[56] References Cited

U.S. PATENT DOCUMENTS

| | | | |
|---|---|---|---|
| 4,969,185 | 11/1990 | Dorst et al. | 379/209 |
| 5,311,574 | 5/1994 | Livanos | 379/214 |
| 5,311,583 | 5/1994 | Friedes et al. | 379/201 |
| 5,479,500 | 12/1995 | Matsuzaki et al. | 379/209 |
| 5,533,100 | 7/1996 | Bass et al. | 379/67 |
| 5,579,382 | 11/1996 | Tsukishima | 379/209 |
| 5,590,183 | 12/1996 | Yoneda et al. | 379/209 |
| 5,627,875 | 5/1997 | Kapsales | 379/211 |
| 5,742,674 | 4/1998 | Jain et al. | 379/201 |

*Primary Examiner*—Scott Wolinsky
*Assistant Examiner*—Benny Q. Tieu
*Attorney, Agent, or Firm*—Banner & Witcoff, Ltd.

[57] ABSTRACT

A system for an international telephone redial service is provided for callers who attempt to complete telephone calls to parties via foreign telephone networks. If a call is not completed, the foreign network returns unsuccessful call reason information related to the cause of the call completion failure. Informative messages may be played to the caller to inform the caller of the nature of a given call failure. Unsuccessful call reason information may be organized in groups, so that each group of unsuccessful call reason information is associated with a different informative message. International redial service may be selectively based on unsuccessful call reason information. International redial service may be inhibited when the cause of a call completion failure is due to a semi-permanent condition, such as when a non-existent number is dialed.

49 Claims, 3 Drawing Sheets

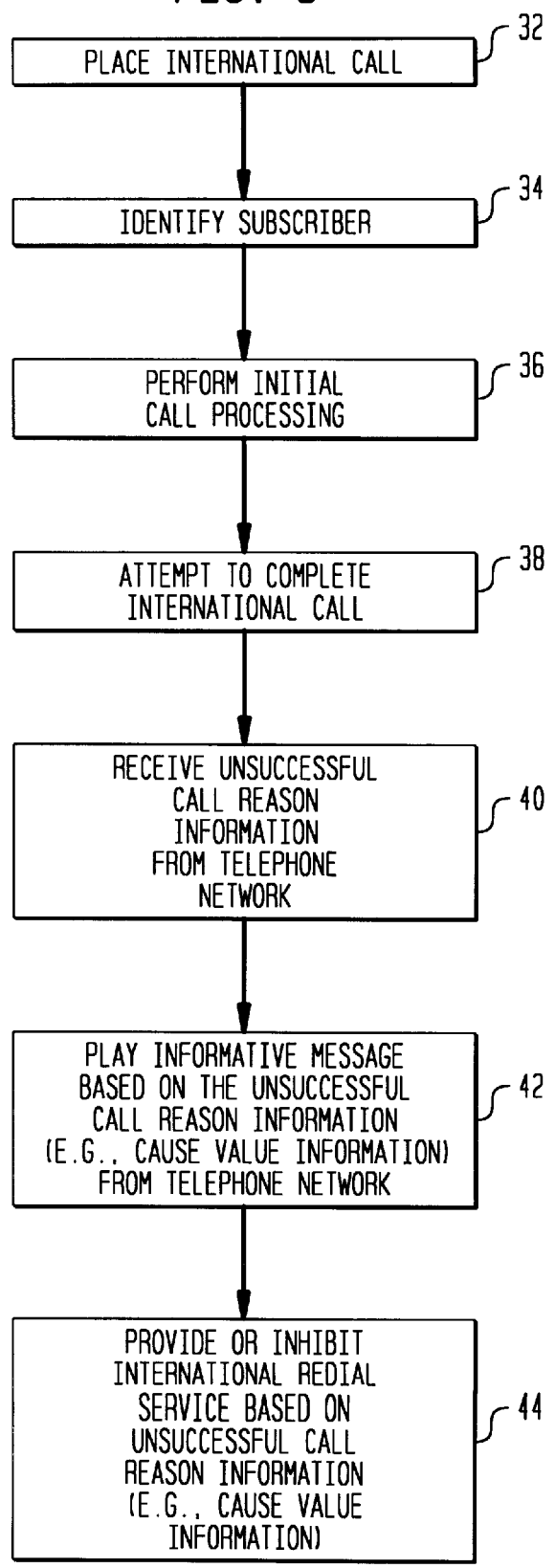

FIG. 4

| CAUSE VALUE | CAUSE |
|---|---|
| CLASS 000 AND 001 - NORMAL EVENT: | |
| 0000001 (1) | UNALLOCATED (UNASSIGNED) NUMBER |
| 0000010 (2) | OPEN FOR FUTURE ASSIGNMENT |
| 0000011 (3) | NO ROUTE TO DESTINATION |
| 0000100 (4) | SEND SPECIAL INFORMATION TONE |
| 0000101 (5) | OPEN FOR FUTURE ASSIGNMENT |
| 0010000 (16) | NORMAL CALL CLEARING |
| 0010001 (17) | USER BUSY |
| 0010010 (18) | NO USER RESPONDING |
| 0010011 (19) | NO ANSWER FROM USER (USER ALERTED) |
| 0010101 (21) | CALL REJECTED |
| 0010110 (22) | NUMBER CHANGED |
| 0011011 (27) | DESTINATION OUT OF ORDER |
| 0011100 (28) | ADDRESS INCOMPLETE |
| 0011101 (29) | FACILITY REJECTED |
| 0011111 (31) | NORMAL UNSPECIFIED |
| CLASS 010 - RESOURCES UNAVAILABLE: | |
| 0100010 (34) | NO CIRCUIT AVAILABLE |
| 0100110 (38) | NETWORK OUT OF ORDER |
| 0101001 (41) | TEMPORARY FAILURE |
| 0101010 (42) | SWITCHING EQUIPMENT CONGESTION |
| 0101100 (44) | REQUESTED CHANNEL NOT AVAILABLE |
| 0101111 (47) | RESOURCE UNAVAILABLE - UNSPECIFIED |
| CLASS 011 - SERVICE OR OPTION AVAILABLE: | |
| 0110010 (50) | OPEN FOR FUTURE ASSIGNMENT |
| 0110111 (55) | INCOMING CALLS BARRED WITHIN CUG |
| 0111001 (57) | BEARER CAPABILITY NOT AUTHORIZED |
| 0111010 (58) | BEARER CAPABILITY NOT PRESENTLY AVAILABLE |
| 0111111 (63) | SERVICE/OPTION NOT AVAILABLE - UNSPECIFIED |

| CAUSE VALUE | CAUSE |
|---|---|
| CLASS 100 - SERVICE OR OPTION NOT IMPLEMENTED: | |
| 1000001 (65) | BEARER CAPABILITY NOT IMPLEMENTED |
| 1000101 (69) | OPEN FOR FUTURE ASSIGNMENT |
| 1000110 (70) | OPEN FOR FUTURE ASSIGNMENT |
| 1001111 (79) | SERVICE OR OPTION NOT IMPLEMENTED - UNSPECIFIED |
| CLASS 101 - INVALID MESSAGE (E.G. PARAMETER OUT OF RANGE): | |
| 1010111 (87) | USER NOT MEMBER OF CUG |
| 1011000 (88) | INCOMPATABLE DESTINATION |
| 1011011 (91) | OPEN FOR FUTURE ASSIGNMENT |
| 1011111 (95) | INVALID MESSAGE - UNSPECIFIED |
| CLASS 110 - PROTOCOL ERROR (E.G. UNKNOWN MESSAGE): | |
| 1100001 (97) | OPEN FOR FUTURE ASSIGNMENT |
| 1100011 (99) | OPEN FOR FUTURE ASSIGNMENT |
| 1100110 (102) | RECOVERY ON TIMER EXPIRE |
| 1100111 (103) | OPEN FOR FUTURE ASSIGNMENT |
| 1101111 (111) | PROTOCOL ERROR - UNSPECIFIED |
| CLASS 111 - INTERWORKING: | |
| 1111111 (127) | INTERWORKING UNSPECIFIED |

INTERNATIONAL REDIAL SYSTEM DRIVEN BY UNSUCCESSFUL CALL REASONS

FIELD OF THE INVENTION

This invention relates to international telecommunications services, and more particularly, to international redial systems that analyze unsuccessful call reason information associated with international call completion failures.

BACKGROUND OF THE INVENTION

International telephone calls sometimes cannot be placed successfully. Called parties may be on the telephone or there may be congestion, so the line cannot be reached. Sometimes the calling party dials a non-existent number or there is an equipment failure in the foreign network. To address these issues, AT&T Corp. has developed an international redial service known under the trademark "AIR" (AT&T International Redial). This international redial service allows callers who are unsuccessful in completing international telephone calls to have the service automatically redial the call. The service typically plays a short message such as "if you would like to use AT&T International Redial Service, please press *234." If the caller presses *234, the redial service automatically attempts to redial the call (e.g., up to ten times in a half hour period.)

When a caller places an international call, the AT&T telephone network determines whether or not the caller is an international redial service subscriber based on calling party identification information that is passed automatically to the network. If the caller is a subscriber to the international redial service, the network passes the call to a network adjunct. The adjunct handles initial call processing, such as determining the language used by the subscriber and determining whether redial service is available to the destination foreign country. Following this initial call processing, call handling is returned to the telephone network for call completion. If an international call cannot be completed, the caller is typically alerted with a short message (e.g., "your call cannot be completed as dialed") or a busy tone.

Under the international standards promulgated by the International Telecommunications Union (ITU), foreign networks may provide certain unsuccessful call reason information to the telephone network that identify the cause of the call completion failure. The format of the unsuccessful call reason information depends upon the standardized signaling format used by the foreign telephone network to indicate call completion failures. For example, some countries, such as the United Kingdom use the ISUP (ISDN or Integrated Services Digital Network User Part) signaling system in which call failures are indicated by the generation of an appropriate "cause value" number. Other countries, such as France, use the TUP (Telephone User Part) signaling system in which call failures are indicated by the generation of an appropriate "signal code." Still other countries use the R2 (Register-Signaling 2) signaling system in which "B-signal" codes are issued when calls fail. If TUP signal codes or other non-ISUP codes are received by the telephone network's International Switching Center, such codes are typically translated into ISUP-type codes, if the telephone network uses ISUP signaling internally. For example, a TUP address incomplete signal code (No. 4) may be translated into an ISUP address incomplete cause value (No. 28) and a TUP unallocated number signal code (No. 7) may be translated into an ISUP unallocated number cause value (No. 1). Call completion failure information such as ISUP cause value information, TUP signal code information, R2 B-signal information, and other suitable call completion failure information provided by a foreign network when an international call is not completed is hereinafter referred to as "unsuccessful call reason information."

The ITU-T (formerly CCITT—Commite' Consultatif International de Telegraphique et Telephonique) Recommendations set forth individual reasons for call completion failure such as "user busy," "incomplete number," "switching equipment congestion," etc. These reasons are conveyed as signals in the modern international signaling systems which are recommended by the ITU-T. For example, the ISUP signaling system can convey up to 127 unsuccessful call reasons in the form of cause values (e.g., "user busy"—cause value number 17, "invalid number format" —cause value number 28, switching equipment congestion—cause value number 42, etc.) Although the telephone network may use unsuccessful call reasons returned by the foreign network (e.g., to determine whether to provide a busy signal or to play a message), the adjunct that supports the international redial service was previously only able to recognize the unsuccessful call reason corresponding to the "user busy" condition (cause value number 17 in the ISUP signaling system).

If the adjunct determined that the cause of the call completion failure was the "user busy" condition, the adjunct could promptly play a message asking the user to press *234 to invoke the automatic redial feature. However, because the adjunct could not identify call completion failures other than the "user busy" condition, the adjunct had to rely on the expiration of a timer to determine whether or not to offer the international redial service in all other cases. If the timer expired and the call had not been completed, the adjunct typically played the standard redial service message (i.e., "if you would like to use AT&T International Redial Service, please press *234").

There are at least two possible disadvantages associated with the international redial service just described. First, offering the redial service when the cause for the call completion failure is the dialing of a non-existent number is inappropriate, because redialing a non-existent number is counterproductive. In such situations, it would be better if the redial service offer could be inhibited. Second, although the adjunct is able to respond quickly and appropriately by offering redial service when an unsuccessful call reason "user busy" is detected, there are many additional causes of call completion failures where a similar response is desired. For example, if a call completion failure is due to switching equipment congestion, it would be desirable if the adjunct could recognize this reason and promptly offer the redial service without waiting for a timer to expire.

It is therefore an object of the present invention to provide a system with improved international telephone call redial services.

SUMMARY OF THE INVENTION

This and other objects of the invention are accomplished in accordance with the principles of the present invention by providing an international redial system for callers attempting to complete telephone calls to parties via a foreign telephone network. If the foreign network cannot complete such a call, the foreign network returns an unsuccessful call reason that indicates the nature of the failure, provided that a modern international signaling system is being used by that network. The unsuccessful call reason information is analyzed to determine what type of message should be provided to the caller and what type of international redial service options should be offered.

If the unsuccessful call reason indicates that a call completion failure was due to a semi-permanent condition, such as the caller dialing a non-existent foreign telephone number, an informative message such as "your call cannot be completed as dialed" may be provided to the caller and the system may inhibit the offer of international redial services. If the cause value information indicates that a call completion failure was due to a temporary problem such as temporary network congestion or the called party's telephone being busy, the system can provide an informative message in the form of a few cycles of the domestic busy signal and can provide an opportunity for electing to use international redial services by providing the message "press *234 to activate international redial service" and waiting for the caller's response.

Further features of the invention, its nature and various advantages will be more apparent from the accompanying drawings and the following detailed description of the preferred embodiments.

BRIEF DESCRIPTION OF THE DRAWINGS

FIG. 3 is a flow chart of steps involved in the present invention.

FIG. 4 is a table of cause value numbers and associated causes of unsuccessful call completion.

DETAILED DESCRIPTION OF THE PREFERRED EMBODIMENTS

Figure 1:
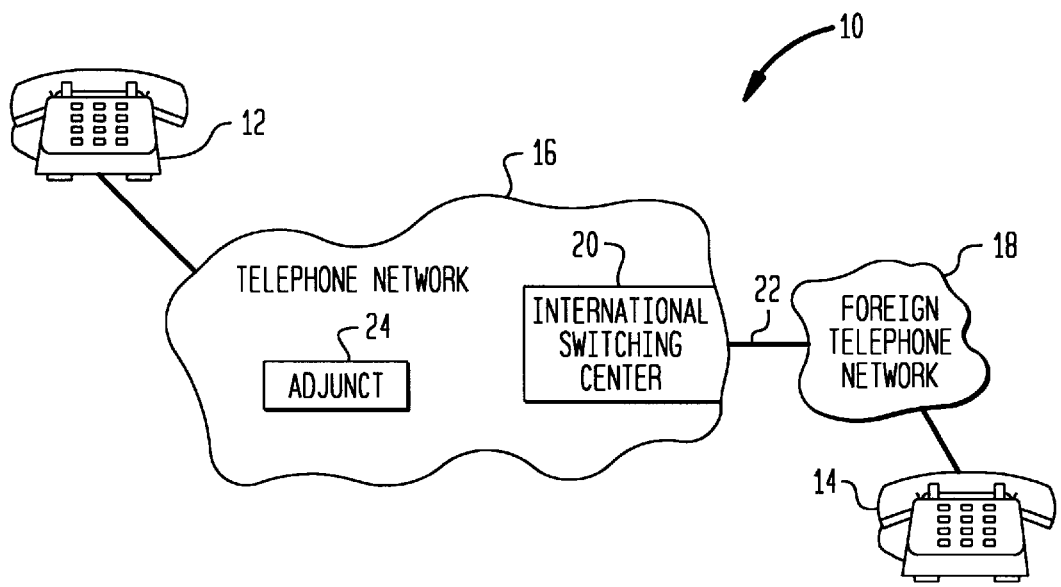
FIG. 1 is schematic diagram of an illustrative network environment for the present invention.

In communications network 10 of FIG. 1, a domestic caller at telephone 12 may call a foreign party at telephone 14 via domestic telephone network 16 and foreign telephone network 18. Calls from domestic telephone network 16 are typically placed to foreign telephone network 18 by international switching center 20, which interfaces with network 18. Domestic telephone network 16 may be, for example, a continental United States telephone network. Trunk 22 may be used as a communications path between networks 16 and 18.

Figure 2:
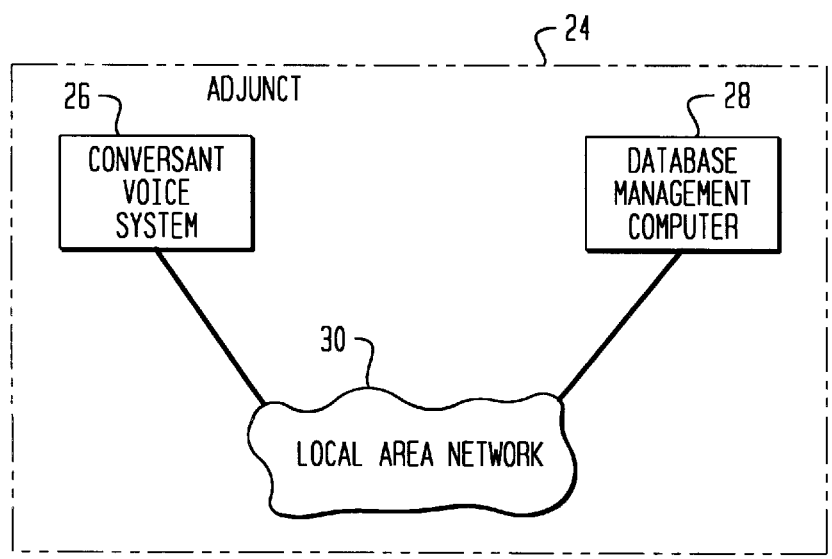
FIG. 2 is a schematic diagram of an illustrative adjunct in accordance with the present invention.

System functions related to international redial service may be provided by adjunct 24. As shown in FIG. 2, adjunct 24 has interactive voice system 26 and database management computer 28, which are interconnected by local area network 30. Interactive voice system 26 may be a Conversant® voice system from Lucent Technologies Inc. of Murray Hill, N.J., an interactive voice system from Nortel, or any other suitable interactive voice system. Interactive voice system 26 is capable of playing messages to the caller and the called party and can process commands from the caller such as dual-tone multi-frequency (DTMF) commands from a standard touch-tone keypad. Database management computer 28 maintains subscriber records and other information necessary to implement the international redial service. Local area network 30 supports data communications between interactive voice system 26 and database management computer 28. Although adjunct 24 is illustrated as being part of telephone network 16, the features of adjunct 24 may be provided by stand-alone equipment if desired.

Steps involved in the operation of system 10 (FIG. 1) are shown in FIG. 3. At step 32, the caller at telephone 12 places a call to a foreign destination. At step 34, telephone network 16 determines whether the caller is a subscriber to the international redial service. If the caller is not a subscriber, telephone network 16 completes the call normally. If the caller is a subscriber, control of the call is passed to adjunct 24, which performs initial call processing at step 36. For example, adjunct 24 determines which language the caller has previously selected to use. This allows messages played to the caller by adjunct 24 to be played in the correct language. Adjunct 24 also determines whether international redial service is available for the destination country.

Following initial call processing by adjunct 24, control of the call is passed back to network 16, which attempts to complete the call via international switching center 20 at step 38. If the call cannot be completed, foreign network 18 provides unsuccessful call reason information to network 16 that indicates the reason for the call completion failure. This information is received by adjunct 24 from network 16 at step 40. An unsuccessful call reason may be provided in the form of an ISUP "cause value number," a TUP "signal code," or any other suitable signal format that identifies the cause of the call failure. If desired, international switching center 20 or other suitable arrangement may be used to translate the information received from trunk 22 (e.g., from TUP signal codes to ISUP cause values) before the information is provided to adjunct 24. The ISUP scheme uses the 127 cause value numbers set forth in the international Integrated Services Digital Network (ISDN) telephone signaling recommendations of the ITU-T. FIG. 4 is a table showing some of the ITU-T cause values and associated causes of unsuccessful call completion.

During steps 42 and 44, adjunct 24 analyzes the unsuccessful call reason returned from foreign network 18. Because an unsuccessful call reason is provided to adjunct 24, adjunct 24 can identify call failures immediately, without waiting for the expiration of a timer.

At step 42, adjunct 24 plays a message for the caller that provides the caller with information on the nature of the call failure. At step 44, adjunct 24 provides an appropriate international redial service option based on the unsuccessful call reason. For example, if a cause value of 1 (unallocated number) is returned, which is indicative of a non-existent number or similar problem, adjunct 24 may immediately play the message "your call cannot be completed as dialed" at step 42 and may inhibit (i.e., prevent from being played) the traditional offer message "if you would like to use AT&T International Redial Service, please press *234" at step 44. An advantage of inhibiting this offer is that it avoids confusing the customer by offering redial service when it would not be effective.

Another example involves cause value 17 (user busy). At step 42, adjunct 24 identifies this cause value and plays a few cycles of domestic busy tone to the caller as the informative message. This lets the caller know in a familiar manner what type of problem exists with the international call. Because the called party's telephone may soon not be busy, international redial service in this situation is desirable. Adjunct 24 may offer redial service at step 44 by playing a message such as "if you would like to use AT&T International Redial Service, please press *234." If the caller presses *234 on the keypad of telephone 12, interactive voice system 26 of adjunct 24 detects that the proper keys have been pressed and initiates automatic redialing of the called international number. One suitable technique involves redialing the called number automatically ten times during a half hour period.

Adjunct 24 may also respond to cause values such as cause value number 42, which indicates the presence of switching equipment congestion. Because such switching equipment congestion may be temporary, adjunct 24 preferably plays a message at step 42 that indicates that the difficulty the caller is having in completing the call is temporary. If desired, adjunct 24 may play a few cycles of the domestic re-order (fast busy) tone as the informative message, or may play a prestored informative voice message (e.g., "all circuits are busy now") using interactive voice system 26. At step 44, adjunct 24 may then play a message to the caller asking whether international redial service is desired (e.g., "press *234 to activate international redial service") and may provide international redial service (e.g., if *234 is pressed).

The foregoing examples are illustrative only. Because 127 different cause values are returned to adjunct 24 by foreign network 18 with the ISUP scheme used in the foregoing examples, the ISUP scheme allows up to 127 different informative messages to be played back to the caller to inform the caller of the nature of call completion failures and to advise the caller of any available international redial service options. There are approximately 12 TUP signal codes, so a TUP-based scheme allows up to approximately 12 different messages to be used. In general, however, it is not necessary for adjunct 24 to provide so many different messages and options. Rather, adjunct 24 may provide a much smaller number of messages and options, each of which corresponds to a group of associated ISUP cause value numbers, TUP signal codes, or other suitable unsuccessful call reasons.

For example, adjunct may provide three informative messages and associated international redial service options. The first message, such as "your call cannot be completed as dialed" may be played back when semi-permanent conditions such as non-existent numbers are detected. In this situation, the offer of international redial service is inhibited. The second message, such as a domestic busy tone may be played when temporary conditions such as "user busy" is detected. A third message such as the domestic re-order (fast busy) tone may be played when a temporary condition such as "switch equipment congestion" is detected. In the second and third situations, international redial service is offered (e.g., by playing the message "if you would like to use AT&T International Redial Service, please press *234" and by providing such service when *234 is pressed).

If desired, adjunct 24 may provide a larger number of informative messages to the caller. For example, rather than playing a domestic re-order (fast busy) tone when a condition such as switching equipment congestion (cause value 42) is detected, adjunct 24 may play the informative message "all circuits are busy now." The caller may then be offered the option of activating international redial service by pressing *234.

The foregoing is merely illustrative of the principles of this invention and various modifications can be made by those skilled in the art without departing from the scope and spirit of the invention. For example, a different subset of unsuccessful call reasons may be provided by foreign network 18. Different informative messages and types of international redial service may be provided by adjunct 24. Different hardware may be used within adjunct 24, provided that adjunct 24 supports message playback and international redial service. Any suitable arrangement may be used for mapping unsuccessful call reasons into tones or other informative messages played by the adjunct.

What is claimed is:

1. An apparatus for providing international telephone redial service to a domestic caller attempting to complete a telephone call to a called party at a foreign destination via a foreign telephone network, the apparatus comprising:

an interface coupled to the foreign network for receiving unsuccessful call reason information from the foreign network; and a computer coupled to the interface, configured to distinguish a class, from a plurality of potential classes, to which the unsuccessful call reason information belongs, and further configured to determine whether international telephone redial service will be offered to the domestic caller based on the class.

2. The apparatus of claim 1, wherein the computer is further configured to recognize whether the class is a class associated with a semi-permanent condition.

3. The apparatus of claim 2, wherein the semi-permanent condition is that the domestic caller has dialed a non-existing foreign telephone number.

4. The apparatus of claim 2, wherein the computer is further configured to inhibit offering telephone redial service to the domestic caller responsive to the class being a class associated with a semi-permanent condition.

5. The apparatus of claim 4, wherein the computer is further configured to provide a message to the domestic caller indicating that a semi-permanent condition exists.

6. The apparatus of claim 5, wherein the computer is further configured to provide the message, a content of the message depending upon the semi-permanent condition.

7. The apparatus of claim 1, wherein the computer is configured to recognize whether the class is a class associated with a temporary condition.

8. The apparatus of claim 7, wherein the temporary condition is at least one of temporary network congestion and the called party's line being busy.

9. The apparatus of claim 7, wherein the computer is further configured to offer telephone redial service to the domestic caller responsive to the class being a class associated with a temporary condition.

10. The apparatus of claim 9, wherein the computer is further configured to provide a message to the domestic caller indicated that a temporary condition exists.

11. The apparatus of claim 10, wherein the computer is further configured to provide the message, a content of the message depending upon the temporary condition.

12. The apparatus of claim 1, wherein the unsuccessful call reason information comprises information selected from the group consisting of: ISUP cause value information, TUP signal codes, and R2 B-signal codes.

13. A method for providing international telephone redial service to a domestic caller attempting to complete a telephone call to a called party at a foreign destination via a foreign telephone network, the method comprising the steps of:

receiving unsuccessful call reason information from the foreign network;

distinguishing a class, from a plurality of potential classes, to which the unsuccessful call reason information belongs; and determining whether international telephone redial service should be offered to the domestic caller based on the class.

14. The method of claim 13, wherein the step of distinguishing includes recognizing whether the class is a class associated with a semi-permanent condition.

15. The method of claim 14, wherein the step of distinguishing further includes recognizing whether the semi-permanent condition is that the domestic caller has dialed a non-existing foreign telephone number.

16. The method of claim 15, further including the step of offering telephone redial service to the domestic caller responsive to the cause value indicating that the telephone call failed to complete due to a temporary condition.

17. The method of claim 16, further including the step of providing a message to the domestic caller indicating that a temporary condition exists.

18. The method of claim 17, wherein the step of providing the message includes providing the message such that a content of the message depends upon the temporary condition.

19. The method of claim 14, further including the step of inhibiting offering telephone redial service to the domestic caller responsive to the class being a class associated with a semi-permanent condition.

20. The method of claim 19, further including the step of providing a message to the domestic caller indicating that a semi-permanent condition exists.

21. The method of claim 20, wherein the step of providing the message includes providing the message such that a content of the message depends upon the semi-permanent condition.

22. The method of claim 13, wherein the step of distinguishing includes recognizing whether the class is a class associated with a temporary condition.

23. The method of claim 22, wherein the step of distinguishing includes recognizing whether the temporary condition is at least one of that there is temporary network congestion and that the called party's line is busy.

24. The method of claim 13, wherein the step of receiving includes receiving the unsuccessful call reason information comprising information selected from the group consisting of:
ISUP cause value information, TUP signal codes, and R2 B-signal codes.

25. In a domestic telephone network, a method for providing international telephone redial service to a domestic caller who unsuccessfully attempts to complete a call via the domestic telephone network to a foreign party through a foreign telephone network, the method comprising the steps of:
receiving from the foreign telephone network at the domestic telephone network unsuccessful call reason information associated with the call, a content of the unsuccessful call reason information indicating at least one out of a plurality of possible reasons why the call cannot be completed;
determining, based on the content of the unsuccessful call reason information, to which of a plurality of classes the unsuccessful call reason information belongs; and
selectively either offering or not offering to the domestic caller to automatically redial the call, depending upon to which of the classes the unsuccessful call reason information belongs.

26. The method of claim 25, wherein the plurality of classes includes a class of temporary conditions and a class of semi-permanent conditions.

27. The method of claim 26, wherein the class of semi-permanent conditions includes a condition that the call is directed to a non-existing number.

28. The method of claim 26, wherein the class of temporary conditions includes a condition that the foreign party is busy and a condition that switching equipment congestion exists.

29. The method of claim 26, wherein the step of selectively either offering or not offering includes offering to the domestic caller to automatically redial the call responsive to the unsuccessful call reason information belonging to the class of temporary conditions, and inhibiting offering to the domestic caller to automatically redial the call responsive to the unsuccessful call reason information belonging to the class of semi-permanent conditions.

30. In a domestic telephone network, a method for providing international telephone redial service to a domestic caller who unsuccessfully attempts to complete a call via the domestic telephone network to a foreign party through a foreign telephone network, the method comprising the steps of:
receiving from the foreign telephone network at the domestic telephone network unsuccessful call reason information associated with the call, a content of the unsuccessful call reason information indicating at least one out of a plurality of possible reasons why the call cannot be completed;
determining, based on the content of the unsuccessful call reason information, whether the unsuccessful call reason information is associated with a temporary condition or with a semi-permanent condition; and
selectively either offering or not offering to the domestic caller to automatically redial the call, depending upon whether the unsuccessful call reason information is associated with the temporary condition or with the semi-permanent condition.

31. The method of claim 30, wherein the semi-permanent condition is that the call is directed to a non-existing number.

32. The method of claim 30, wherein the temporary condition is that the foreign party is busy.

33. The method of claim 30, wherein the temporary condition is that switching equipment congestion exists.

34. The method of claim 30, wherein the step of selectively either offering or not offering includes offering to the domestic caller to automatically redial the call responsive to the unsuccessful call reason information being associated with the temporary condition, and inhibiting offering to the domestic caller to automatically redial the call responsive to the unsuccessful call reason information being associated with the semi-permanent condition.

35. Apparatus for providing international telephone redial service to a domestic caller who unsuccessfully attempts to complete a call via a domestic telephone network to a foreign party through a foreign telephone network, the apparatus comprising:
an interface coupled to the foreign network and configured to receive unsuccessful call reason information from the foreign network, a content of the unsuccessful call reason information indicating at least one out of a plurality of possible reasons why the call cannot be completed; and
a computer coupled to the interface and configured to determine, based on the content of the unsuccessful call reason information, to which of a plurality of classes the unsuccessful call reason information belongs, the computer being further configured to selectively either offer or not offer to the domestic caller to automatically redial the call, depending upon to which of the classes the unsuccessful call reason information belongs.

36. The apparatus of claim 35, wherein the computer is further configured to provide a message to the domestic caller, a content of the message depending upon to which of the classes the unsuccessful call reason information belongs.

37. The apparatus of claim 35, wherein the plurality of classes includes a class of temporary conditions and a class of semi-permanent conditions.

38. The apparatus of claim 37, wherein the class of semi-permanent conditions includes a condition that a non-existing number was dialed by the domestic caller.

39. The apparatus of claim 37, wherein the class of temporary conditions includes a condition that the foreign party is busy and a condition that switching equipment congestion exists.

40. The apparatus of claim 37, wherein the computer is configured to offer to the domestic caller to automatically redial the telephone call responsive to the unsuccessful call reason information belonging to the class of temporary conditions, and to inhibit offering to the domestic caller to automatically redial the telephone call responsive to the unsuccessful call reason information belonging to the class of semi-permanent conditions.

41. Apparatus for providing international telephone redial service to a domestic caller who unsuccessfully attempts to complete a call via a domestic telephone network to a foreign party through a foreign telephone network, the apparatus comprising:

an interface configured to receive from the foreign telephone network at the domestic telephone network unsuccessful call reason information associated with the call, a content of the unsuccessful call reason information indicating at least one out of a plurality of possible reasons why the telephone call cannot be completed; and a computer configured to determine, based on the content of the unsuccessful call reason information, whether the unsuccessful call reason information is associated with a temporary condition or with a semi-permanent condition, the computer being further configured to selectively either offer or not offer to the domestic caller to automatically redial the call, depending upon whether the unsuccessful call reason information is associated with the temporary condition or with the semi-permanent condition.

42. The apparatus of claim 41, wherein the semi-permanent condition is that a non-existing number was dialed by the domestic caller.

43. The apparatus of claim 41, wherein the temporary condition is that the foreign party is busy.

44. The apparatus of claim 41, wherein the temporary condition is that switching equipment congestion exists.

45. The apparatus of claim 41, wherein the computer is further configured to offer to the domestic caller to automatically redial the telephone call responsive to the unsuccessful call reason information being associated with the temporary condition, and inhibit offering to the domestic caller to automatically redial the telephone call responsive to the unsuccessful call reason information being associated with the semi-permanent condition.

46. Apparatus for providing international telephone redial service to a domestic caller who unsuccessfully attempts to complete a call via a domestic telephone network to a foreign party through a foreign telephone network, the apparatus comprising:

means for receiving from the foreign telephone network at the domestic telephone network unsuccessful call reason information associated with the call, a content of the unsuccessful call reason information indicating at least one out of a plurality of possible reasons why the call cannot be completed;

means for determining, based on the content of the unsuccessful call reason information, to which of a plurality of classes the unsuccessful call reason information belongs; and means for selectively either offering or not offering to the domestic caller to automatically redial the call, depending upon to which of the classes the unsuccessful call reason information belongs.

47. The apparatus of claim 46, wherein the plurality of classes includes a class of temporary conditions and a class of semi-permanent conditions.

48. The apparatus of claim 47, wherein the means for selectively either offering or not offering includes means for offering to the domestic caller to automatically redial the telephone call responsive to the unsuccessful call reason information belonging to the class of temporary conditions, and for inhibiting offering to the domestic caller to automatically redial the telephone call responsive to the unsuccessful call reason information belonging to the class of semi-permanent conditions.

49. Apparatus for providing international telephone redial service to a domestic caller who unsuccessfully attempts to complete a call via a domestic telephone network to a foreign party through a foreign telephone network, the apparatus comprising:

means for receiving from the foreign telephone network at the domestic telephone network unsuccessful call reason information associated with the call, a content of the unsuccessful call reason information indicating at least one out of a plurality of possible reasons why the telephone call cannot be completed;

means for determining, based on the content of the unsuccessful call reason information, whether the unsuccessful call reason information is associated with a temporary condition or with a semi-permanent condition; and means for selectively either offering or not offering to the domestic caller to automatically redial the call, depending upon whether the unsuccessful call reason information is associated with the temporary condition or with the semi-permanent condition.

* * * * *